(12) United States Patent
Abed et al.

(10) Patent No.: US 10,021,285 B2
(45) Date of Patent: Jul. 10, 2018

(54) SUPPLEMENTAL FLASH SYSTEM

(71) Applicants: Tark Abed, Palo Alto, CA (US); Manu Pillai, San Jose, CA (US)

(72) Inventors: Tark Abed, Palo Alto, CA (US); Manu Pillai, San Jose, CA (US)

(73) Assignee: Tark Abed, Palo Alto, CA (US)

( * ) Notice: Subject to any disclaimer, the term of this patent is extended or adjusted under 35 U.S.C. 154(b) by 0 days.

(21) Appl. No.: 15/153,201

(22) Filed: May 12, 2016

(65) Prior Publication Data
US 2016/0337566 A1 Nov. 17, 2016

Related U.S. Application Data

(60) Provisional application No. 62/160,377, filed on May 12, 2015.

(51) Int. Cl.
*G03B 15/02* (2006.01)
*H04N 5/225* (2006.01)

(52) U.S. Cl.
CPC ......... *H04N 5/2256* (2013.01); *H04N 5/2252* (2013.01)

(58) Field of Classification Search
CPC ............ G03B 2215/0517; G03B 17/02; G03B 21/2013; G03B 2215/05; G03B 2215/0557; G03B 27/54
USPC .......................................................... 362/11
See application file for complete search history.

(56) References Cited

U.S. PATENT DOCUMENTS

| | | | | |
|---|---|---|---|---|
| 6,138,826 A | * | 10/2000 | Kanamori | A45C 11/38 206/316.2 |
| 2005/0099799 A1 | * | 5/2005 | Cugini | F21L 14/00 362/105 |
| 2005/0281552 A1 | * | 12/2005 | Konishi | G03B 17/04 396/301 |
| 2009/0014624 A1 | * | 1/2009 | Blees | F21L 4/00 362/187 |

* cited by examiner

*Primary Examiner* — William Carter
(74) *Attorney, Agent, or Firm* — Robert G. Crouch; Marsh Fischmann & Breyfogle LLP (57) ABSTRACT

A supplemental flash system that may be included in a waterproof, protective case for a camera. The supplemental flash system is designed to illuminate the scene just prior to capturing the image with the camera. The supplemental flash system may be triggered by user actuation of a control on the case, by user actuation of a control on an external trigger, or through an app on a smart phone. Optionally, the case may include a mechanical interface on the bottom surface thereof for connection to a variety of types of mounts. Optionally, the flash system may provide for the ability to change the illumination spectrum. Optionally, the flash system may be controllable to place it into one of a plurality of different types of signaling modes.

20 Claims, 8 Drawing Sheets

SUPPLEMENTAL FLASH SYSTEM

This application claims the benefit of U.S. Provisional Application No. 62/160,377, filed May 12, 2015, the entire contents of which is incorporated herein by reference in its entirety.

BACKGROUND

The disclosure herein relates generally to techniques and equipment that may be used in conjunction with supplemental lighting systems for modern digital cameras and film cameras.

Many electronic/digital cameras do not have flash systems included therein. This has led to the development of various forms of external, supplemental lighting systems to aid in the capture of images. Unfortunately, unlike older film-based SLR cameras (which often included an electrical connector known as a "hot shoe"), most modern cameras do not include an electrical interface for an external lighting system to work in concert with the camera. Without such an electrical interface to the camera, external lighting systems for modern cameras face various challenges. Most importantly, there is no way to synchronize the flash of light with the camera exposure, without finding a way to integrate with the camera control software in the camera. Of course, access to this software is often blocked by camera vendors for proprietary reasons.

Modern work-arounds for these challenges focus on the user turning on a video lamp, then using the camera, and then turning off the video lamp. The extended duration needed for this, with high intensity lamps such as high intensity LEDs, results in excessive consumption of battery power and additional thermal management challenges. The complexity of user needing to perform two separate operations on two different devices also reduces the user experience.

In addition, many modern cameras do not provide a mechanical interface to provide for a simple connection to various types of mounts (e.g., tripods). Further, many modern cameras are not packaged in a manner to allow them to be used in various environments (e.g., in rain, near bodies of water, underwater, in wind-blown sandy areas, and so forth). There is at least one manufacturer (GoPro, Inc.) that provides a waterproof case for its cameras, but the case comes with a mount permanently affixed to the bottom surface thereof which prevents the case from resting normally on a horizontal surface.

Also, different environments may provide different challenges and issues for illumination light (e.g., water absorbs light differently depending on its wavelength (color) so the illumination spectrum typically used in air is not suitable underwater). Lastly, various situations a camera user may encounter may cause them to want to signal others such as rescuers, friends, and others.

What is needed, therefore, is a design for a lighting system for a modern camera that is better able to meet such challenges.

SUMMARY

Disclosed herein is a supplemental flash system, for operation in conjunction with a separate camera having an image capture button, the camera capturing an image of light coming from a first direction. The supplemental flash system includes a support structure receptive of a separate camera; an actuator attached to the support structure in a position proximate to an image capture button of the separate camera when the separate camera is received by the support structure, wherein the actuator, when actuated, activates the image capture button of the separate camera; an actuator control operatively connected to the actuator to control the operation of the actuator to actuate when the actuator control receives an illuminate signal; an illuminator that provides light directed generally in the first direction when the illuminator receives the illuminate signal; and a trigger that is activated by a user, the trigger generating the illuminate signal when the trigger is activated. The illuminator provides light generally in the first direction before the image is captured.

The image captured may be a video of multiple images. The trigger may continuously generate the trigger signal in order to provide illumination light while a video is being captured. In the absence of the trigger signal, the illuminator may cease to provide illumination light and the actuator actuates the image capture button in order to request the camera to cease capturing video.

The support structure may include a mechanical interface that receives one of a plurality of connector blocks for connection to an external mount. The mechanical device may include a slot for slidably receiving a portion of the mount.

The illuminator may provide light with significant components across the entire visible light spectrum, and further wherein the illuminator may selectably provide light with a boost in a predetermined portion of the visible light spectrum. The illuminator may include a first light source that provides light across a broad wavelength spectrum and a second light source that provides light across only a portion of the wavelength spectrum. The second light source may provide light in the red portion of the visible light spectrum. The second light source may include a red LED. The second light source may include a white LED.

The illuminator may be controlled to alternate between providing light and not providing light in a periodic pattern. The pattern may be varied by user control.

BRIEF DESCRIPTION OF THE DRAWINGS

The disclosure herein is described with reference to the following drawings, wherein like reference numbers denote substantially similar elements.

DETAILED DESCRIPTION

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Disclosed herein are techniques and systems related to improved supplemental flash systems that may be part of a waterproof, protective case for a modern digital camera (e.g., without limitation, the GoPro™Hero3™ and Hero4™ series), which includes a locally and remotely controlled flash. The supplemental flash system enables users to use their GoPro (or other) cameras in low light and underwater situations, with proper color balancing for any given scenario. The flash system may turn on the flash just before the camera shutter is depressed, all in a single push, controlled via electro-thermal-mechanical means that completely bypass software dependencies. This enables the camera's exposure control systems to take advantage of the flash light fully, while minimizing the on-time for the lamp and also reducing thermal complications by design. The lamp/flash may turn off within 200 milliseconds for a single capture, and may stay on longer for a multi-shot capture or for video capture. The exposure time can be controlled as needed, and can respond to inputs from the user or control application, allowing the supplemental flash system to adapt as needed over time.

Further, a configurable mechanical interface enables the supplemental flash system to be retrofitted to any camera that has a mechanical shutter release, irrespective of hot-shoe availability, and yet be used in a single-push mode, that automatically enables pre-lighting before the camera exposure control systems apply aperture and shutter control logic, thus enabling consistent results.

Figure 1:
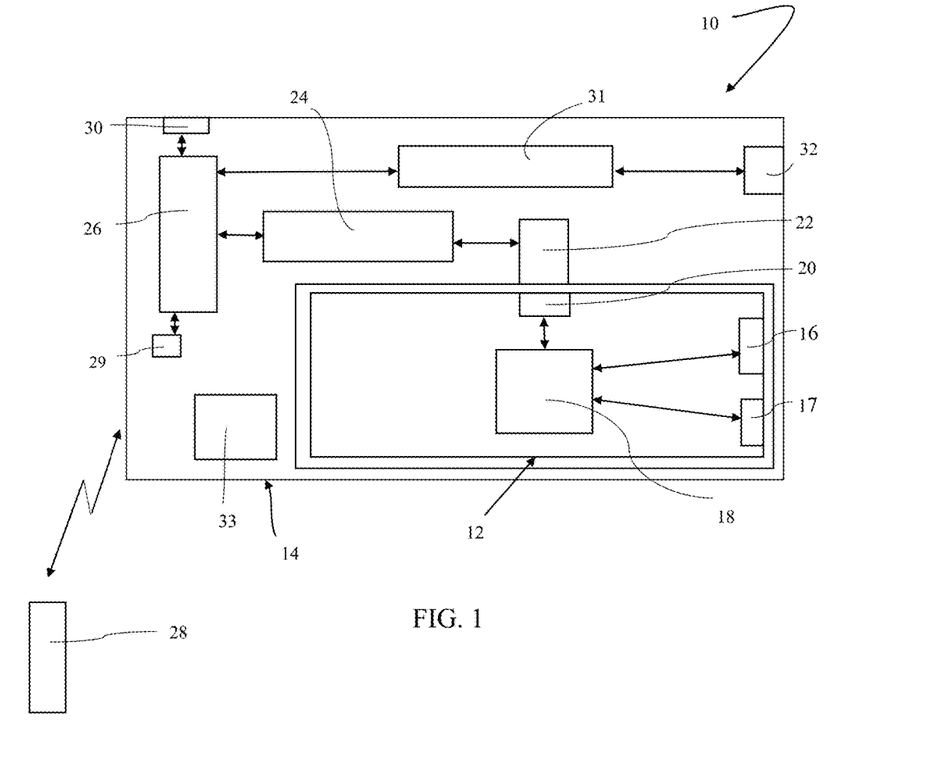
FIG. 1 is a block diagram of a system described herein.

FIG. 1 shows a system 10 that includes a digital camera 12 and a supplemental flash system 14. The camera 12 may include an image capture device 16 (e.g., an image sensor and related optics), a light sensor 17, a controller 18, and an image capture control or button 20. The supplemental flash system 14 may include a solenoid device 22, a solenoid controller 24, a trigger controller 26, a flash controller 31, an illuminator 32, and a power source 33 (e.g., a battery). The trigger controller 26 may receive an image capture command from an external trigger 28 or from an image capture control or button 30 within the supplemental flash system 14. A communication device 29 may be included in the supplemental flash system 14 in order to communicate with the external trigger 28. The solenoid controller 24 may receive an actuation command from the trigger controller 26 and, in response thereto, the solenoid controller controls the solenoid 22 to actuate and activate the image capture control 20 of the camera 12. The flash controller 31 may receive an illuminate command from the trigger controller 26 and, in response thereto, the flash controller controls the illuminator 32 to actuate and illuminate the scene in front of the supplemental flash system 14.

Figure 2:
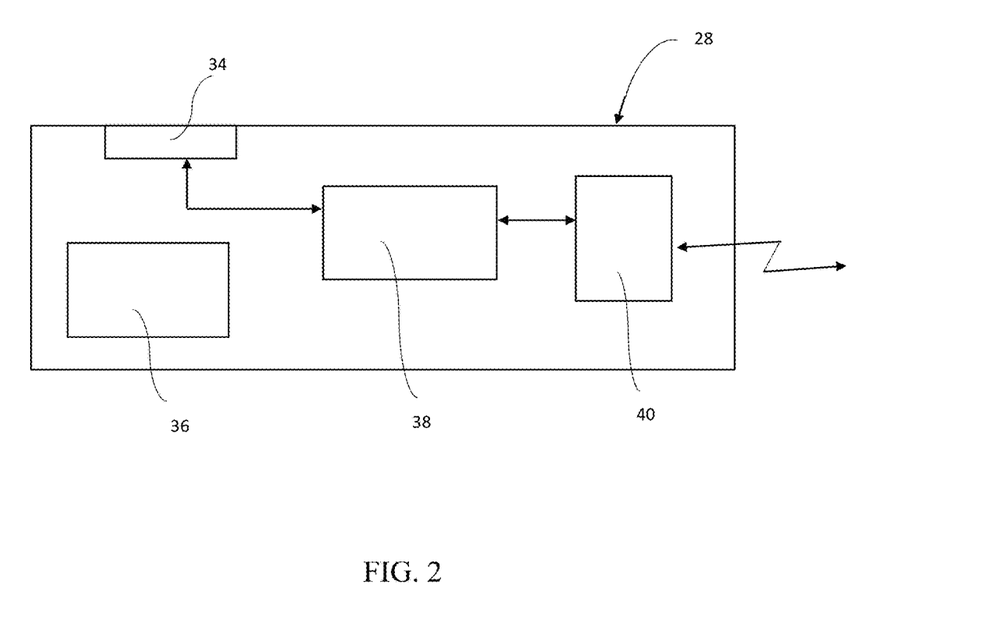
FIG. 2 is a block diagram of an external trigger that may be used in the system of FIG. 1.

The external trigger 28 may be a small device that is external to the system and may, for example, be in the general shape and size of a tube of chapstick. The trigger 28 may include a user control device 34 which may include any appropriate type of switch, button, touchscreen, or other. The trigger 28 may also include: a small power source 36 such as a battery; a controller 38 or other suitable form of electronics; and a means 40 for communicating a trigger signal to the supplemental flash system 14. This communication means 40 may include a Bluetooth™ communication device that communicates with the communication device 29 in the supplemental flash system 14. A smart phone could serve as the external trigger 28, such as by using an app loaded on the smart phone. Such an app might allow the user to control both the supplemental flash system 14 and the camera 12.

In practice, a user can actuate the user control device 34 of the external trigger 28 when the user desires to capture an image. This causes a trigger signal to be communicated, via Bluetooth™, to the trigger controller 26 of the supplemental flash system 14. In response, the trigger controller 26 first generates the illuminate command which it provides to the flash controller 31. The trigger controller 26 next generates the actuation command which it provides to the solenoid controller 24. In turn, the flash controller 31 and the solenoid controller 24 cause the illuminator 32 and the solenoid 22, respectively, to activate and illuminate the scene and actuate the image capture control 20 of the camera 12. As it is desirable for the illumination to begin prior to image capture (and prior to the camera's sensing of the brightness of the scene), the relative timing of the generation of the illuminate command and the actuation command can be controlled or selected in advance by the manufacturer of the supplemental flash system 14 and/or selected in advance by the user of the of the supplemental flash system 14.

Figure 3:
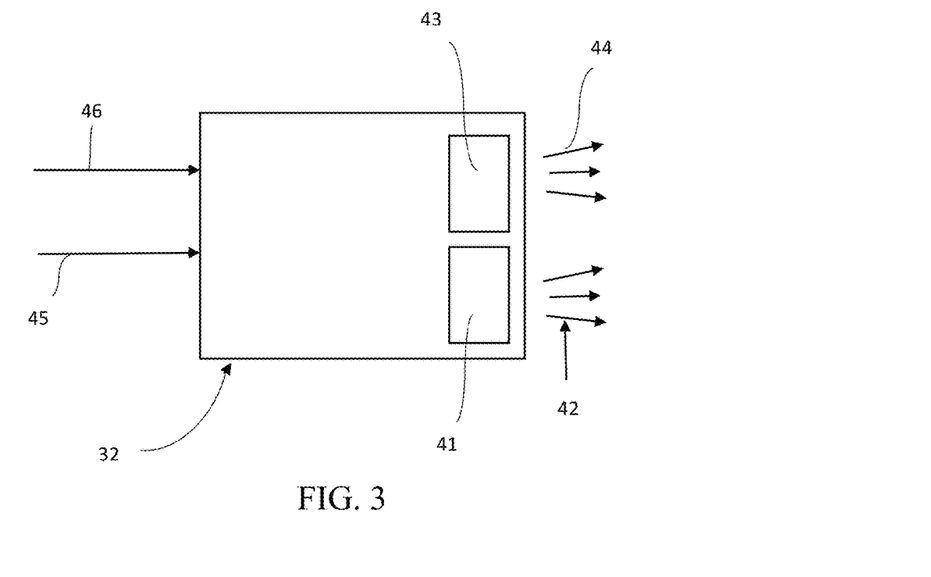
FIG. 3 is a simplified illustration of an illuminator that may used in the system of FIG. 1.

As is shown in FIG. 3, the illuminator 32 may include a broad spectrum LED 41 that may generate white light 42 (e.g., light with a substantial amount of light intensity across the visible light spectrum) and a narrower-band LED 43 that may generate red light 44 (e.g., light with substantial intensity in all or portions of the red portion of the visible light spectrum and with significantly decreased intensity in the remaining portions of the visible light spectrum). Either or both of these LEDs 41 and 43 can be actuated via one or more input signals 45 and 46.

Figure 4:
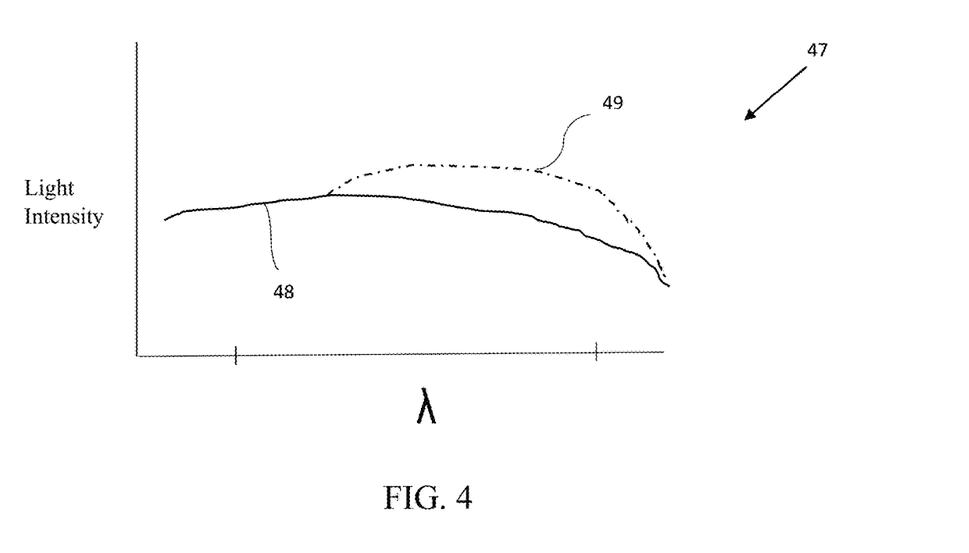
FIG. 4 is a simplified plot of an illumination spectrum that may be provided by the illuminator of FIG. 3.
Figure 5:
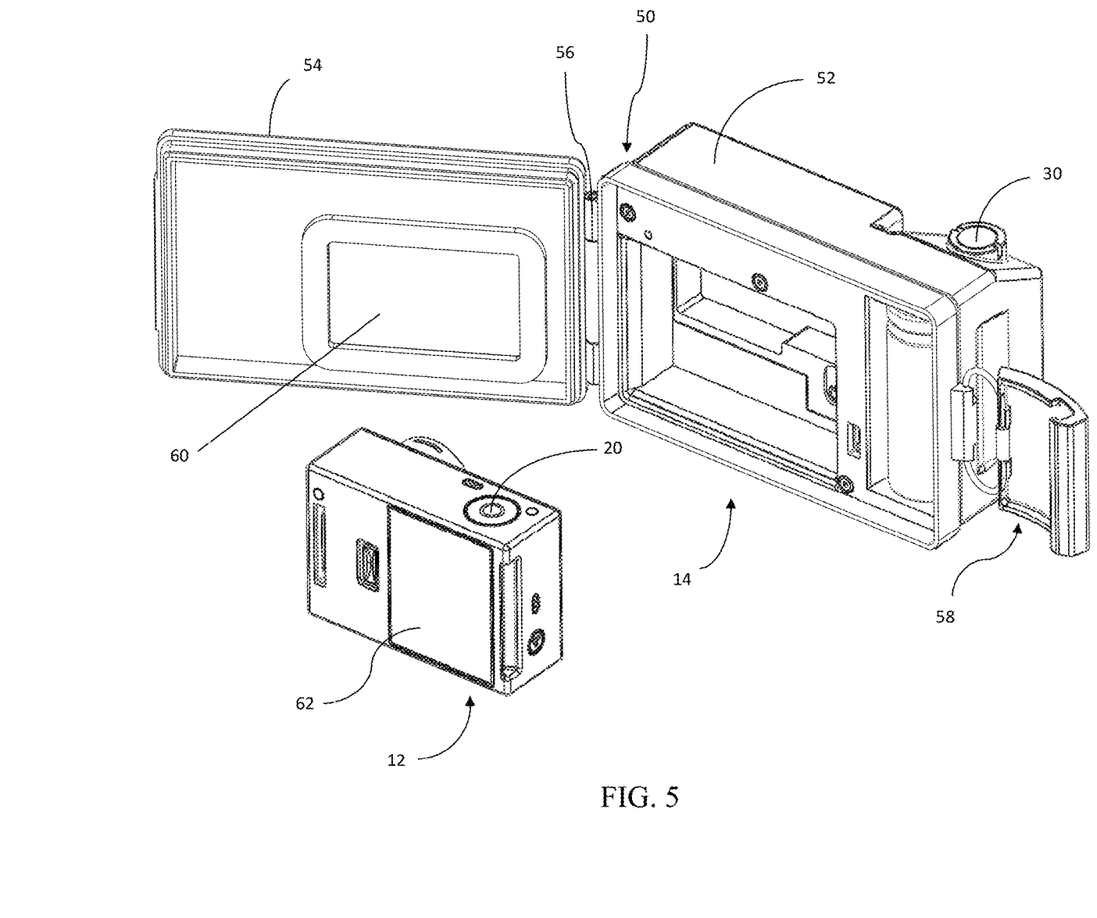
FIG. 5 is an illustration of a camera positioned outside of the waterproof, protective case disclosed herein.
Figure 6:
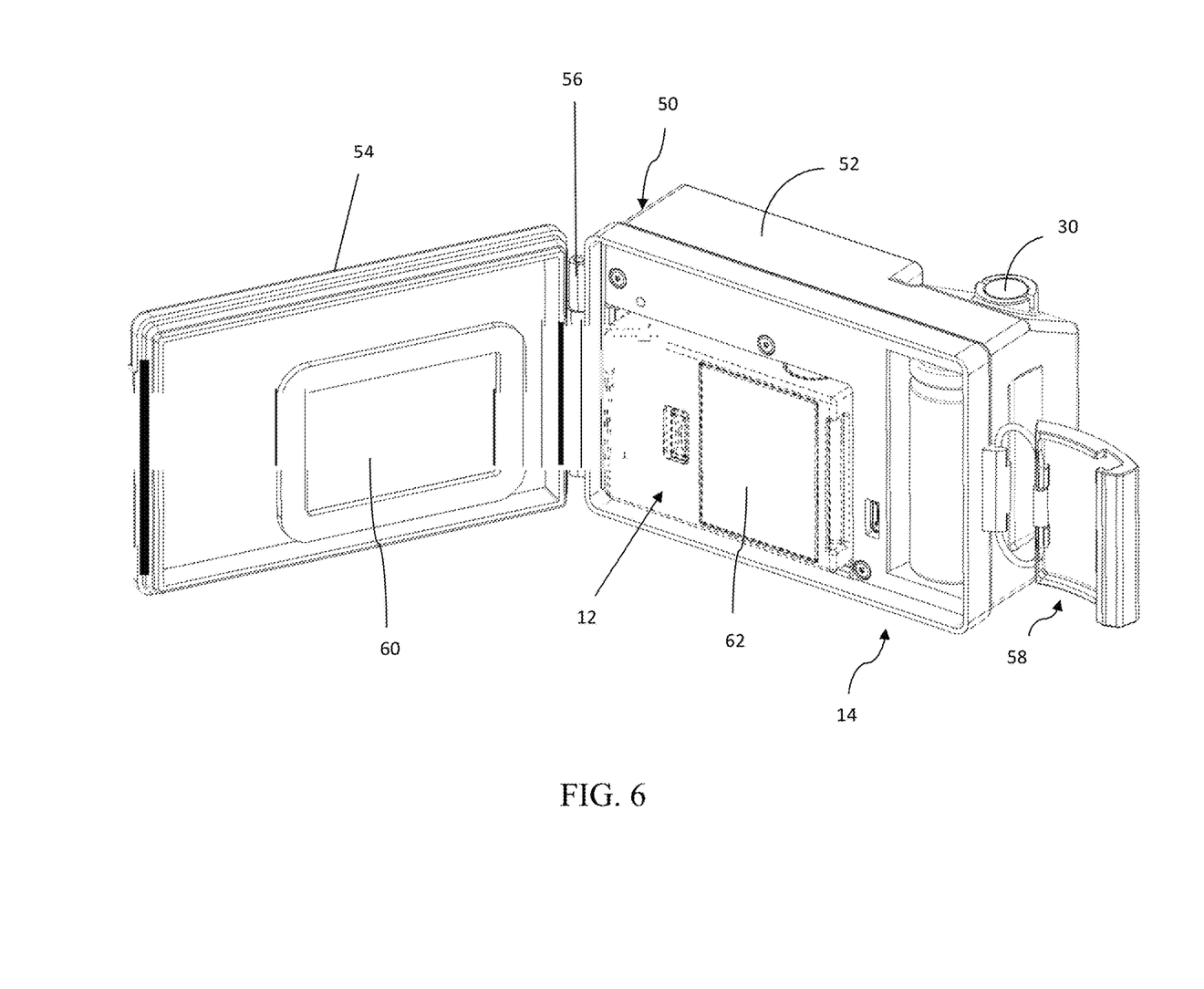
FIG. 6 is an illustration of the camera and protective case of FIG. 5, but with the camera received within the case.
Figure 7:
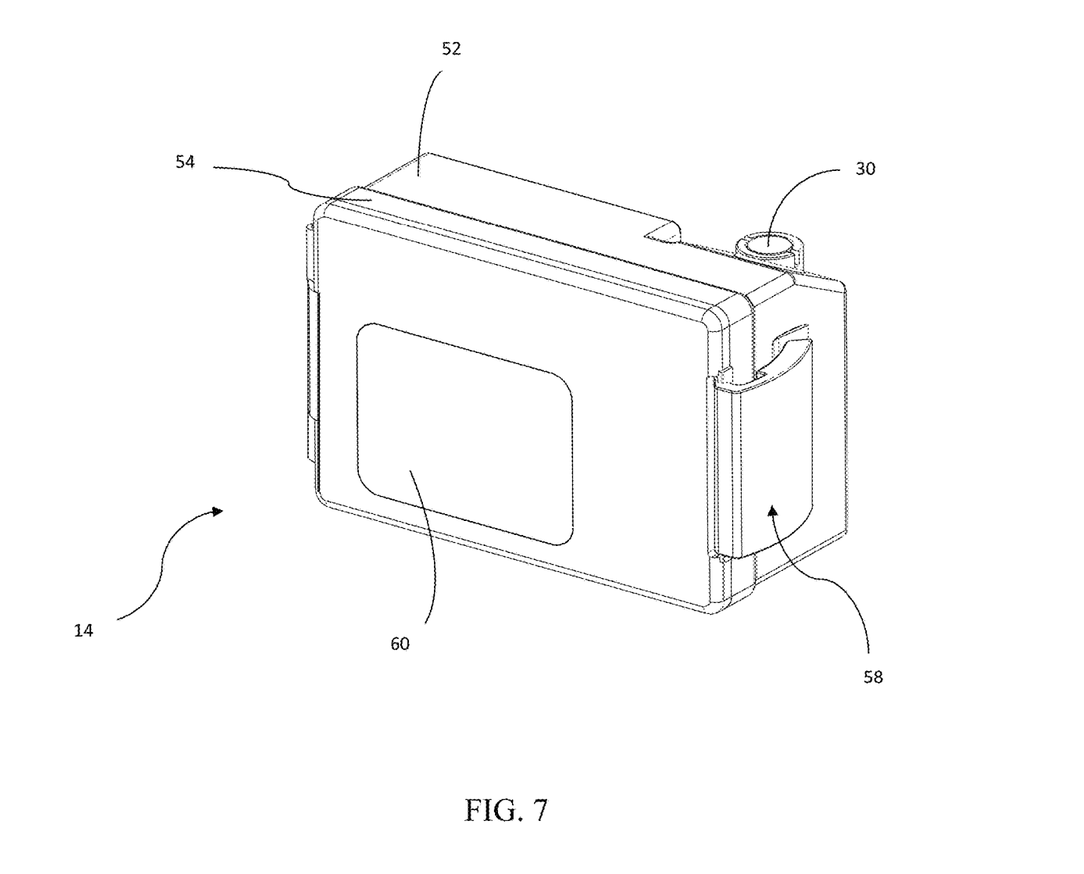
FIG. 7 a rear perspective view of the case in a closed position.
Figure 8:
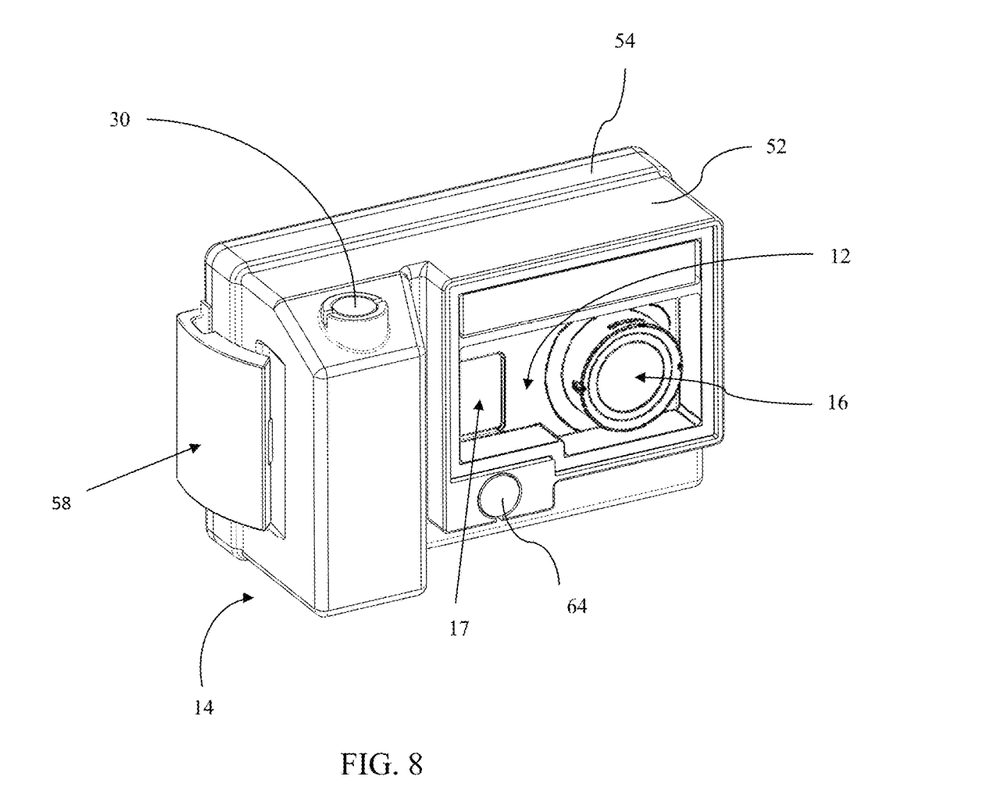
FIG. 8 is a front perspective view of the case in a closed position with the camera retained therein.

FIG. 4 shows a plot 47 of light intensity versus wavelength for the LEDs 41 and 43. Solid line 48 is a general representation of the light intensity from white LED 41, while the broken line 49 shows the way in which the red portion of the visible light spectrum is increased by adding the light 44 from red LED 43 with the light 42 from white LED 41. Using both LEDs 41 and 43 may be desirable in cases where it is desired to increase the red portion of the visible light spectrum in the illumination light, such as when the environment greatly attenuates red light relative to other colors in the visible light spectrum. This may be the case for capturing images and videos underwater.

As is shown in FIGS. 5-8, the supplemental flash system 14 may be incorporated into a housing 50 that receives the camera 12 therein and protects it from external elements, such as water and sand. The housing may include first and second housing portions 52 and 54 that are pivotably connected together via a hinge 56 and are retained in a locked position together by a clasp 58. The housing 50 can be designed to closely-fit and receive a specific camera, such as those available from GoPro, Inc, Sony (Action Cam™), or Garmin (VIRB™), by way of non-limiting example. As can be appreciated, the housing 50 is transparent, at least in the areas of the housing covering the imaging optics 16 of the camera 12 (via a window 60), the light sensor 17 of the camera 12, and the display 62 of the camera 12. Of course, the entire body of the housing 50 could also be transparent. The housing 50 may have the image capture control/button 30 on the surface thereof, and may have other controls on the surface thereof such as a button 64 to power on and off the camera 12 and such as to provide for other user control of the camera.

Figure 9:
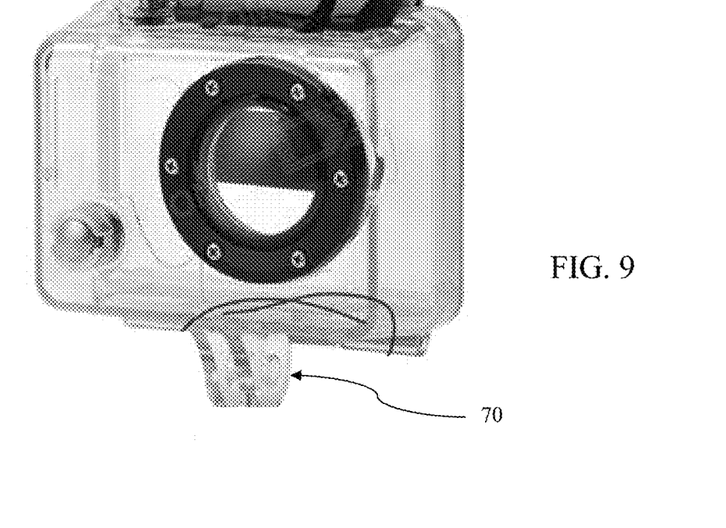
FIG. 9 is view of a prior art camera and protective case.
Figure 10:
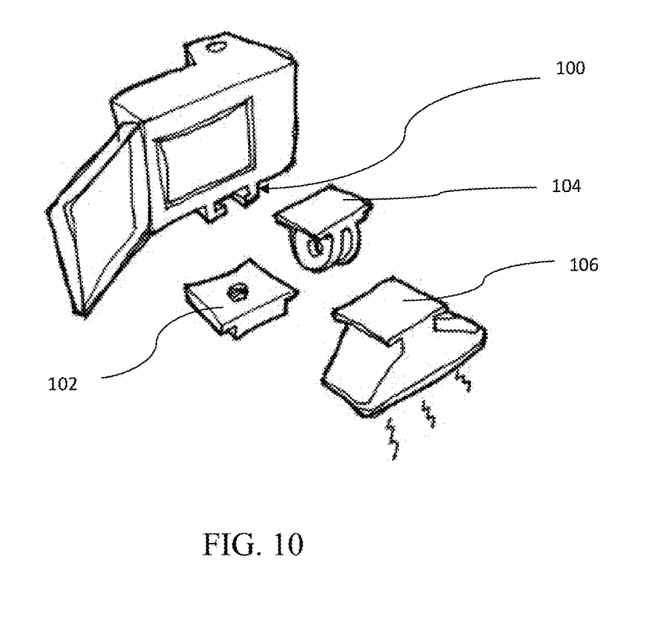
FIG. 10 is a simplified illustration of different types of mounts that can be received within a mechanical interface provided on the bottom surface of the protective case.

FIG. 9 is an illustration of a prior art waterproof case for a GoPro™ camera, showing a pair of parallel mounting flanges 70 that extend out from the bottom surface of the case. FIG. 10 is an illustration of a mechanical mounting interface 100 on the housing 50, wherein the interface provides for any one of a plurality of different types of interchangeable mechanical mounts to be mounted thereto. A variety of different mounts 102, 104, and 106 are shown, as non-limiting examples only. Mount 102 may include the standard attachment for a tripod. Mount 104 may provide the pair of parallel mounting flanges available in the prior art mount. Mount 106 may provide the ability to mechanically couple to a car hood or roof, or other ferromagnetic surface.

In addition, it may be desirable and beneficial for the user of the supplemental flash system to put the illuminator 32 into any of a variety of signaling modes. These modes could include a particular, repeating pattern of light pulses of various durations, colors, temporal spacing, frequency, or of some other pattern. Below are at least two different features that could be provided.

A "Find Me" feature might allow the user to create a unique colorful, flashing lighting pattern, via a smart phone App. This feature might be intended to act as a signal to others, such as friends. For example, this feature might come in handy when the user is lost in a crowd (e.g., at a sporting event or music festival), separated from friends, or when there is a great distance between two to or more parties. The supplemental flash system 14 could include a plurality of user controllable multi-color LEDs. The user could create a unique pattern, in both color, and timing of the pattern, in effect creating a colorful strobe.

Alternatively or in addition, a "Safety/Hazard" feature could be provided. This feature might be designed to be used only in extreme conditions. For example, if a skier goes off-piste, crashes and is debilitated, they can use this feature to allow safety crews to find the skier. To activate this mode, for example, the user might press and hold the image capture button 30 for five seconds, and the device 14 will go into a low power state, using a single LED, putting it into a low frequency strobe sequence. This might be especially useful during the onset of nightfall. This might make the injured individual more visible to rescue crews.

There are many alternatives to the specifics discussed herein. For one thing, any of the features shown in any of the discussion provided herein could be incorporated into or combined with any other feature or design discussed herein. As a further example, any of the functionality of any of the described components could be combined with other components or further separated. For example, multiple ones of the controllers mentioned herein could be combined or they could be further separated out. Also, the solenoid 22 could move a member into contact with the image capture button 20 of the camera 12, so as to displace the button sufficiently to initiate the image capture function of the camera 12, or it could cause a member to change its properties in anyway such as to actuate a different type of control than a mechanical button. This could include temperature sensing, capacitance sensing, or other.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A supplemental flash system for operation in conjunction with a separate camera having an image capture button, the camera capturing an image of light coming from a first direction, the supplemental flash system comprising:
   a support structure receptive of a separate camera;
   an electro-mechanical actuator attached to the support structure in a position directly adjacent an image capture button of the separate camera when the separate camera is received by the support structure, wherein the electro-mechanical actuator, when actuated with an electrical signal, activates the image capture button of the separate camera via mechanical movement to be in contact therewith;
   an actuator control operatively connected to the electro-mechanical actuator to control the operation of the electro-mechanical actuator to actuate when the actuator control receives an illuminate signal;
   an illuminator that provides light directed generally in the first direction when the illuminator receives the illuminate signal; and
   a trigger that is activated by a user, the trigger generating the illuminate signal when the trigger is activated;
   wherein the illuminator provides light generally in the first direction before the image is captured.

2. A supplemental flash system as defined in claim 1, wherein the image captured is a video of multiple images.

3. A supplemental flash system as defined in claim 2, wherein the trigger can continuously generate the trigger signal in order to provide illumination light while a video is being captured.

4. A supplemental flash system as defined in claim 3, wherein in the absence of the trigger signal, the illuminator ceases to provide illumination light and the actuator actuates the image capture button in order to request the camera to cease capturing video.

5. A supplemental flash system as defined in claim 1, wherein the support structure includes a mechanical interface that receives one of a plurality of connector blocks for connection to an external mount.

6. A supplemental flash system as defined in claim 5, wherein the mechanical device includes a slot for slidably receiving a portion of the mount.

7. A supplemental flash system as defined in claim 1, wherein the illuminator provides light with significant components across the entire visible light spectrum, and further wherein the illuminator can selectably provide light with a boost in a predetermined portion of the visible light spectrum.

8. A supplemental flash system as defined in claim 7, wherein the illuminator includes a first light source that provides light across a broad wavelength spectrum and a second light source that provides light across only a portion of the wavelength spectrum.

9. A supplemental flash system as defined in claim 8, wherein the second light source provides light in the red portion of the visible light spectrum.

10. A supplemental flash system as defined in claim 9, wherein the second light source includes a red LED.

11. A supplemental flash system as defined in claim 1, wherein the second light source includes a white LED.

12. A supplemental flash system as defined in claim 1, wherein the illuminator can be controlled to alternate between providing light and not providing light in a periodic pattern.

13. A supplemental flash system as defined in claim 12, wherein the pattern can be varied by user control.

14. A supplemental flash system as defined in claim 1, wherein the actuator activates the image capture button of the separate camera by mechanical force.

15. A supplemental flash system as defined in claim 1, wherein the actuator activates the image capture button of the separate camera by a change in capacitive properties of the actuator.

16. A supplemental flash system as defined in claim 1, wherein a trigger signal is generated externally to the support structure and communicated wirelessly to the support structure so that the illuminate signal can be generated.

17. A supplemental flash system for operation in conjunction with a separate camera having an image capture button, the camera capturing an image of light coming from a first direction, the supplemental flash system comprising:
  a support structure receptive of a separate camera;
  a controller retained by the support structure and receptive of an image capture command and operative to selectably provide an illuminate signal and an actuator signal;
  a flash unit retained by the support structure and receptive of the illuminate signal and operative to provide illumination in response to the illuminate signal; and
  an electro-mechanical actuator that receives an electrical signal and in response thereto causes physical movement of a member of the actuator, the actuator being retained by the support structure and positioned adjacent the image capture button of the separate camera when the separate camera is received within the support structure, the electro-mechanical actuator controllable to selectably actuate the image capture button of the separate camera via direct mechanical contact in response to the actuator signal.

18. A supplemental flash system as defined in claim 17, further including an image capture control device retained by the support structure and operable by a user to generate the image capture command.

19. A supplemental flash system as defined in claim 17, wherein the controller receives the image capture command wirelessly from an external device.

20. A supplemental flash system for operation in conjunction with a separate camera having an image capture button, the camera capturing an image of light coming from a first direction, the supplemental flash system comprising:
  a support structure receptive of a separate camera;
  a controller retained by the support structure and receptive of an image capture command and operative to selectably provide an illuminate signal and an actuator signal;
  a flash unit retained by the support structure and receptive of the illuminate signal and operative to provide illumination in response to the illuminate signal; and
  a solenoid actuator retained by the support structure and positioned adjacent the image capture button of the separate camera when the separate camera is received within the support structure, the solenoid actuator controllable to selectably actuate the image capture button of the separate camera in response to the actuator signal.

* * * * *